June 19, 1962 W. L. MORRISON 3,039,276
BULK FREEZER
Filed Aug. 4, 1960 3 Sheets-Sheet 1
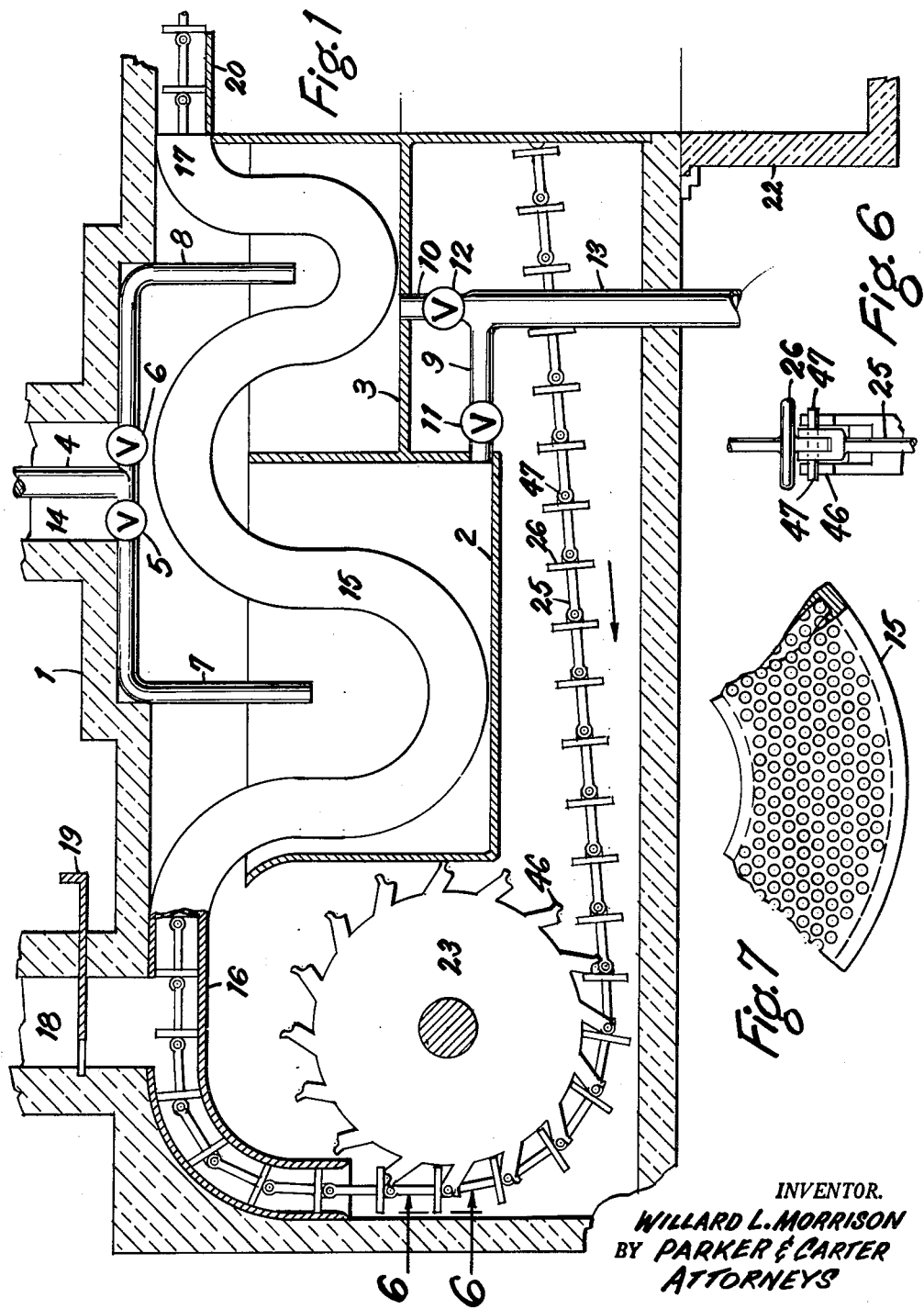
INVENTOR.
WILLARD L. MORRISON
BY PARKER & CARTER
ATTORNEYS

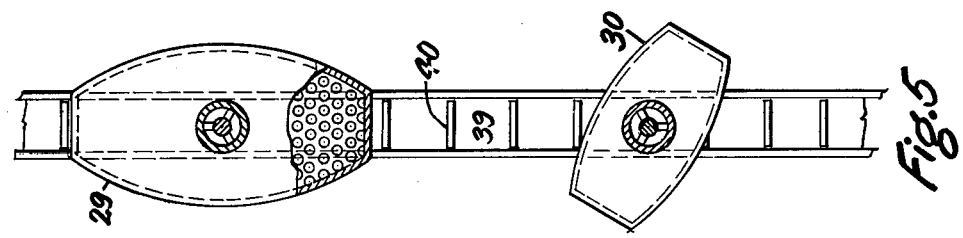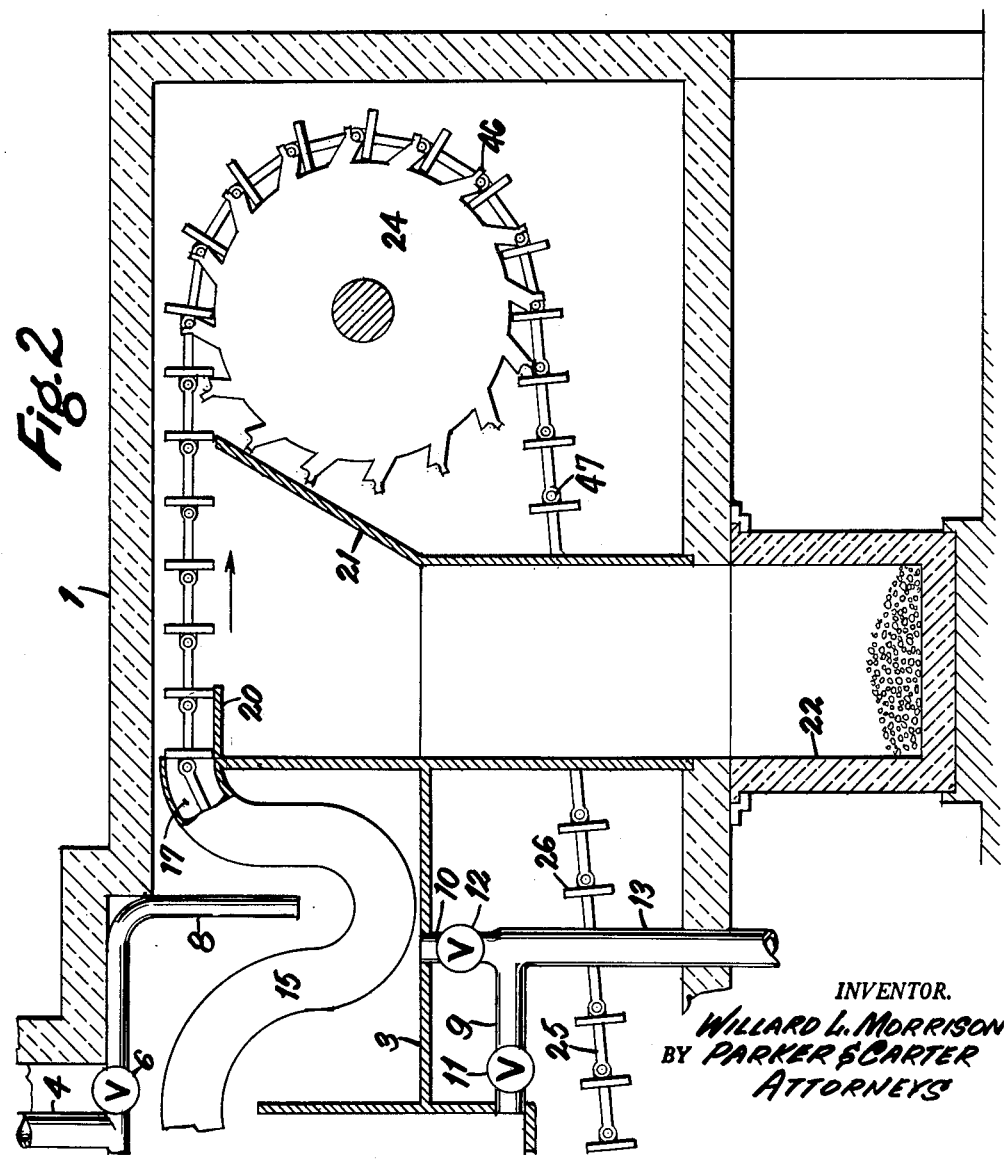

June 19, 1962 — W. L. MORRISON — 3,039,276
BULK FREEZER
Filed Aug. 4, 1960 — 3 Sheets-Sheet 3
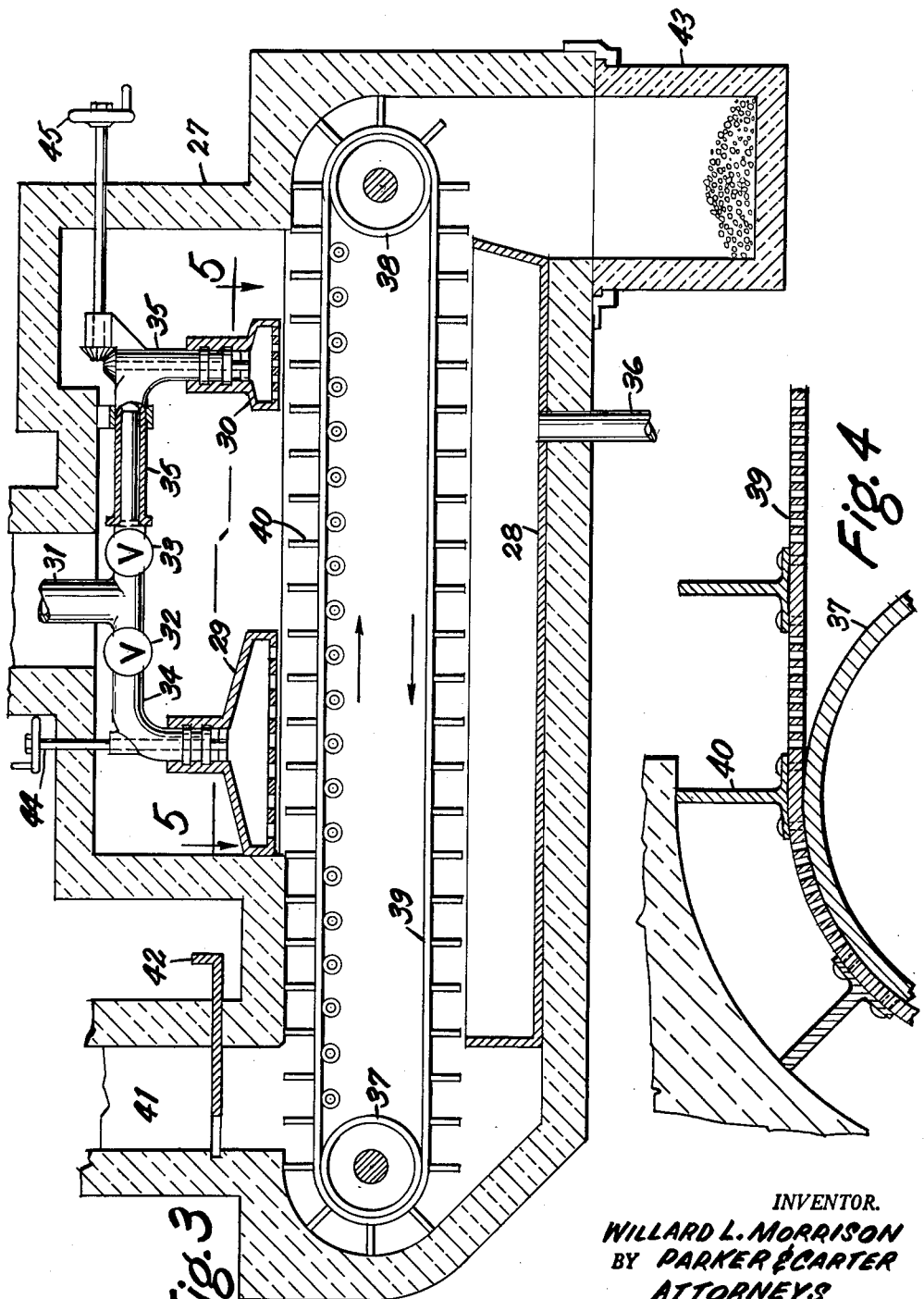
INVENTOR.
WILLARD L. MORRISON
BY PARKER & CARTER
ATTORNEYS United States Patent Office 3,039,276
Patented June 19, 1962

3,039,276
BULK FREEZER
Willard L. Morrison, Lake Forest, Ill., assignor to Liquefreeze Company, Inc., New York, N.Y., a corporation of New York
Filed Aug. 4, 1960, Ser. No. 47,468
13 Claims. (Cl. 62—64)

My invention relates to improvements in method and apparatus for bulk freezing of unpackaged, loose, edible material and is especially adapted to the treatment of food material such as beans, peas or larger vegetables, either whole or sliced.

I have illustrated my method and apparatus in a situation especially well adapted to handling fresh peas and for convenience where I refer to peas as the edible material throughout specification and claims, it will be understood that this is merely a generic name for all types of edible material.

There is need for the bulk freezing of such material at a high rate of speed so that the freezing may keep up with the high rate of ripening of the food and the frozen bulk material may thereafter at leisure be packed for shipment.

Such freezing has been accomplished by the use of cold air in wind tunnels or by contact with cold plates but this is a slow and expensive process and large capacity expensive machinery is required to keep up with the inflow of fresh ripe peas as they are harvested.

This freezing can be done much more rapidly and much less expensively by the use of liquid nitrogen at atmospheric pressure and —320 degrees F., which liquid when brought into immediate contact with the peas boils, evaporates and may be reliquefied for reuse.

When the peas at ambient temperature are brought into direct contact with the liquid nitrogen, the outside layers are chilled to very low temperature and tend to shrink while the inner portion of the pea remains at high temperature with resultant cracking of the shrunken cold outer layers.

I have found out that if the peas are exposed to this liquid nitrogen for a very short length of time and then withdrawn from that exposure for a length of time sufficient to permit heat migration to tend to equalize the temperature of the inside and outside of the pea, the pea may thereafter be again exposed to liquid nitrogen for a length of time sufficient to lower its entire temperature down to the desired low point. For example, one particular variety of peas can be immersed in or directly exposed to and wet with liquid nitrogen for not more than fifteen seconds without cracking. If it is withdrawn from such immersion after not more than fifteen seconds, then exposed to the gaseous nitrogen boiled off from the liquid for approximately fifteen seconds, it may then be immersed in the bath or exposed to the liquid for three seconds, a sufficient length of time to bring it down to the desired temperature.

The length of first exposure to the liquid, subsequent exposure to the gas and second exposure to the liquid depends entirely upon the particular characteristic of the pea or other vegetable but the essential thing is that there must be first an exposure to the liquid nitrogen at atmospheric pressure and —320 degrees F., followed by a time interval during which the pea is exposed only to the gas so as to give time for temperature equalization and followed again by direct contact with the liquid down to the desired temperature.

While the gas is at approximately the same temperature as the liquid, —320 degrees F., the liquid is six hundred times as dense as the gas so that the cooling effect of the gas is so small in comparison to the cooling effect of the liquid that mere removal from the liquid and exposure to the gas is sufficient to permit the desired equalization of temperature to prevent cracking.

Under some circumstances, depending on the character of the vegetable itself, it may be desirable to have more than two immersions with exposure to the gas between each pair of contact with the liquid.

This desired result may be accomplished by actual immersion of the peas in a liquid nitrogen bath or it may be accomplished by cascading or pouring the liquid onto the peas for the desired length of time. In each case after such liquid contact, the peas will be exposed to the dry gas. Thus there is no danger of condensation on the peas, which condensation might freeze them again and make subsequent packaging inconvenient.

My invention is illustrated more or less diagrammatically in the accompanying drawings, wherein:

FIGURE 1 is a diagrammatic sectional view through the feed end of an apparatus wherein the peas are immersed in a liquid nitrogen bath;

FIGURE 2 is a diagrammatic section through the discharge end of the device shown in FIGURE 1;

FIGURE 3 is a diagrammatic section of a form of the device where the peas are flooded with liquid nitrogen;

FIGURE 4 is an enlarged section similar to the left hand end of FIGURE 3;

FIGURE 5 is a section on an enlarged scale along the line 5—5 of FIGURE 3;

FIGURE 6 is a plan view of a detail of the chain viewed in the direction of the arrows 6—6;

FIGURE 7 is a fragmentary side elevation of the guide duct 15.

Like parts are indicated by like numerals throughout the specification and drawings.

Referring first to FIGURES 1 and 2, the insulated housing 1 contains liquid tight bath receptacles 2 and 3 arranged in series. Liquid nitrogen from a suitable source, preferably a reliquefier, enters through the main feed pipe 4 and discharged, controlled by supply valves 5 and 6 through the ducts 7 and 8 to the bath receptacles 2 and 3 respectively. Excess liquid may be discharged from the receptacles 2 and 3 through discharge ducts 9 and 10 controlled by valves 11, 12 through the main discharge pipe 13 for return of excess liquid to the source of supply. By manipulating these valves the level of the baths in the receptacles 2 and 3 may be controlled as desired, depending upon the time of exposure required.

The gas discharge duct 14 also conducts gas back to the reliquefier.

Contained within the housing 1 is a serpentine foraminous guide duct 15. It has two downwardly extending loops, one imersed in each of the liquid bath receptacles 2, 3. An upper loop passing over the boundary between the two receptacles and so exposed to the gas in the housing and at both ends, has upper horizontal feed sections 16 and discharge sections 17. The feed section 16 communicates with a feed duct 18 controlled by a material supply valve 19. The discharge section 17 terminates in a discharge platform 20 immediately above the discharge hopper 21 which is in register with the removable insulating bulk receptacle 22.

Adjacent each end of the housing 1 are sprocket wheels 23 and 24. They are driven in unison by any suitable variable speed source of power not here illustrated as the details form no part of the present invention and are conventional. Traveling over these sprocket wheels is a conveyor chain 25 carrying a plurality of flights 26. These flights are of such size as to make a smooth working fit with the interior of the guide duct 15.

Peas are fed into the feed section 16 of the guide duct 15 controlled by the material supply valve at such rate that the space between successive flights is never entirely filled but it is desirable that as the flights pass through the guide duct there will be no danger of crushing as there would be if the flight sections were completely filled. As the chain travels in the direction of the arrow, successive batches of peas are drawn along the guide duct 15 down into immersion in the bath in chamber 2, then up into the area above the bath where they are exposed to the dry gaseous nitrogen and back again into the bath 3 before they are drawn out and discharged into the hopper 21, whence they fall by gravity in frozen, dry condition into the removable bulk receptacle 22.

By controlling the linear rate of travel of the conveyor chain and by controlling the depth of the two baths, the time of exposure to first bath, gaseous nitrogen and second bath may be adjusted in sequence with the character of the material being treated. Because the chain enters and leaves both baths along vertical lines the time of immersion of each pea in each batch is always the same so that uniform treatment of individual peas may be effected.

In the modified form shown in FIGURES 3, 4 and 5, the housing 27 contains a receptacle 28 for spent liquid nitrogen. Above the receptacle 28 are two shower heads 29, 30 which receive liquid nitrogen from the reliquefier through duct 31 controlled by valves 32, 33 and discharge pipes 34, 35. These shower heads discharge a flood or cascade of liquid nitrogen against the peas as will hereinafter appear. The spent liquid falling by gravity into the receptacle 28 from which it is discharged through duct 36 for return of the reliquefier. The valves 32 and 33 control the rate of flow of the liquid in the usual manner.

Pulleys 37, 38 driven in unison at controlled variable speed by any conventional source of power not here illustrated, carry a foraminous endless belt 39. From this belt projects flights 40 and as the belt is driven in clockwise direction as shown by the arrows, the contents of the belt between the flights is carried along below the shower heads 29 and 30. The belt receives its contents of peas and the like through the feed duct 41 controlled by the feed valve 42. Again the rate of flow will be such that the space between the two pair of flights will never be entirely filled. As the flights pass on beneath the first shower head, the peas are soaked, flooded with liquid nitrogen. As they pass beyond the shower head, they are exposed to the gaseous nitrogen evaporated by the peas and then again they are exposed to the flood of nitrogen from shower head 30. Thus the peas are first wet with liquid nitrogen, then have time during which they are exposed only to gas and then are wet again with liquid nitrogen and then finally discharged over the pulley 38 into the portable, removable receptacle 43.

The shower heads 29 and 30 are shown in detail in FIGURE 5. Each head is rotatably mounted on its respective duct 34 and 35 and may be rotated by hand wheels 44 and 45. The shower heads are so proportioned that for instance in FIGURE 5, head 29 gives maximum length of travel exposed to the liquid. Head 30 being inclined, gives a shorter length of travel. The relation of these two shower heads makes it possible to adjust the time during which the peas are exposed to the flood of liquid. The time interval between the two may be effected by longitudinal displacement of the shower head 30, the hand wheel 45 being movable longitudinally to slide the duct 35 back and forth.

The peas are light. They move rapidly and in the interest of clarity, the roller along which the belt 39 travels to maintain it along a horizontal path has been shown only diagrammatically.

The sprockets 23 and 24 are peculiar in that they include a plurality of fingers 46 to engage the pins 47 of the chain 25 and hold the flights out of contact with the body of the sprockets so that there will be no tendency of distortion of the flights.

Since the vegetables enter and leave the baths at the feed and discharge end, they are exposed both at entry and exit to the cold gas so that they are to some extent cooled at both ends after transit by gas but they are not exposed to the gas for any extended period of time and the important cooling takes place while in the bath or while the vegetables are exposed to the flood of liquid nitrogen.

In general, I thus first expose the vegetables to dry gaseous nitrogen in an entry zone, then to liquid nitrogen in a preliminary freezing zone, then to dry gaseous nitrogen in a temperature equalization zone, then to liquid nitrogen in a final freezing zone and at last to dry gaseous nitrogen in a discharge zone.

While the gaseous nitrogen to which the food is exposed in the entry zone, the equalization zone and the discharge zone is cold because it has the nitrogen boiled off from the cold bath, the time of exposure is so short and the effect of the cold gas is so small that the cooling effect of the gas in comparison with the cooling effect of the liquid is a very unimportant factor. That makes it possible to use the gas as the atmosphere for the temperature equalization zone.

The particular peas of the example above referred to are in the order of one-half to one-quarter inch in diameter. In general the smaller the pea, the longer possible time of exposure to liquid nitrogen without cracking. Even after exposure to the gas in the equalizing zone, it is important that the time of exposure for the second time be less than the exposure for the first time.

I claim:

1. The method of freezing unpackaged bulk vegetables which consists in exposing them to contact with liquid nitrogen in a preliminary freezing zone, removing them from such zone and exposing them to contact with dry gaseous nitrogen in a temperature equalization zone, then again exposing them to contact with liquid nitrogen in a final freezing zone, all such contacts being at substantially atmospheric pressure.

2. The method of freezing unpackaged bulk solid granular vegetables such as peas and beans which consists in exposing them to dry gaseous nitrogen in an entry zone, exposing them to contact with liquid nitrogen in a preliminary freezing zone, exposing them to contact with dry gaseous nitrogen in a temperature equalization zone, exposing them to contact with liquid nitrogen in a final freezing zone, exposing them to contact with dry gaseous nitrogen in a discharge zone, all such contacts being at substantially atmospheric pressure and substantially −320 degrees F.

3. The method of freezing bulk unpackaged vegetables which consists in passing them through a bath of liquid nitrogen at atmospheric pressure and −320 degrees F., then exposing them to dry gaseous nitrogen at substantially the same temperature and pressure and again passing them through a bath of liquid nitrogen at atmospheric pressure and −320 degrees F.

4. The method of freezing bulk solid granular vegetables such as peas and beans which consists in passing them through a flowing stream of liquid nitrogen at atmospheric pressure and −320 degrees F., then exposing them to dry gaseous nitrogen at substantially the same pressure and temperature and then passing them through another stream of flowing liquid nitrogen at atmospheric pressure and −320 degrees F.

5. The method of freezing unpackaged bulk solid granular vegetables such as peas and beans which consists in exposing them to contact with liquid nitrogen in a preliminary freezing zone, removing them from such zone and exposing them to contact with dry gaseous nitrogen in a temperature equalization zone, then again exposing them to contact with liquid nitrogen in a final freezing zone, all such contacts being at substantially atmospheric pressure, the time of exposure in the preliminary freezing zone being greater than the time of exposure in the final freezing zone.

6. The method of freezing unpackaged bulk solid granular vegetables such as peas and beans which consists in exposing them to contact with liquid nitrogen in a preliminary freezing zone, removing them from such zone and exposing them to contact with dry gaseous nitrogen in a temperature equalization zone, then again exposing them to contact with liquid nitrogen in a final freezing zone, all such contacts being at substantially atmospheric pressure, the time of exposure in the preliminary and equalization zones being substantially equal.

7. The method of freezing unpackaged bulk solid granular vegetables such as peas and beans which consists in exposing them to contact with liquid nitrogen in a preliminary freezing zone, removing them from such zone and exposing them to contact with dry gaseous nitrogen in a temperature equalization zone, then again exposing them to contact with liquid nitrogen in a final freezing zone, all such contacts being at substantially atmospheric pressure, the time of exposure in the preliminary and equalization zones being substantially equal, the time of exposure in the final zone being less than that in the preliminary zone.

8. The method of freezing unpackaged bulk solid granular vegetables such as peas and beans which consists in exposing them to contact with liquid nitrogen in a preliminary freezing zone, removing them from such zone and exposing them to contact with dry gaseous nitrogen in a temperature equalization zone, then again exposing them to contact with liquid nitrogen in a final freezing zone, and varying the time of exposure in all three zones in consonance with the character of the vegetables being frozen, all such contacts being at substantially atmospheric pressure.

9. In an insulated housing, a pair of independent liquid tight receptacles, means for maintaining a bath of liquid nitrogen at atmospheric pressure in each receptacle and means for independently controlling the bath levels, a foraminous serpentine duct including downwardly extending loops, one immersed in each bath, an upwardly extending portion on both sides of each bath, means for feeding material to be frozen to the duct and means for propelling material through the duct and through both baths for discharge from the housing.

10. In an insulated housing, a foraminous belt, means for moving it along a generally horizontal path, a plurality of flights upwardly projecting from the belt, means for supplying material to be frozen to the belt and means for discharging two separate streams of liquid nitrogen spaced along the path of the belt at atmospheric pressure downwardly against the material carried by the belt.

11. In an insulated housing, a foraminous belt, means for moving it along a generally horizontal path, a plurality of flights upwardly projecting from the belt, means for supplying material to be frozen to the belt and means for discharging two separate streams of liquid nitrogen spaced along the path of the belt at atmospheric pressure downwardly against the material carried by the belt, means for independently adjusting the time during which each stream engages the contents of the belt.

12. In an insulated housing, a foraminous belt, means for moving it along a generally horizontal path, a plurality of flights upwardly projecting from the belt, means for supplying material to be frozen to the belt and means for discharging two separate streams of liquid nitrogen spaced along the path of the belt at atmospheric pressure downwardly against the material carried by the belt, means for adjusting the distance between the two streams along the belt.

13. In an insulated housing, a foraminous belt, means for moving it along a generally horizontal path, a plurality of flights upwardly projecting from the belt, means for supplying material to be frozen to the belt and means for discharging two separate streams of liquid nitrogen spaced along the path of the belt at atmospheric pressure downwardly against the material carried by the belt, means for recovering the liquid discharged from the belt for reuse and means for recovering the gas boiled off by contact with the foodstuff for reliquefaction.

References Cited in the file of this patent
UNITED STATES PATENTS

| | | |
|---|---|---|
| 1,898,758 | Bottoms | Feb. 21, 1933 |
| 2,454,704 | McMichael | Nov. 23, 1948 |
| 2,784,567 | Reynolds | Mar. 12, 1957 |